UNITED STATES PATENT OFFICE.

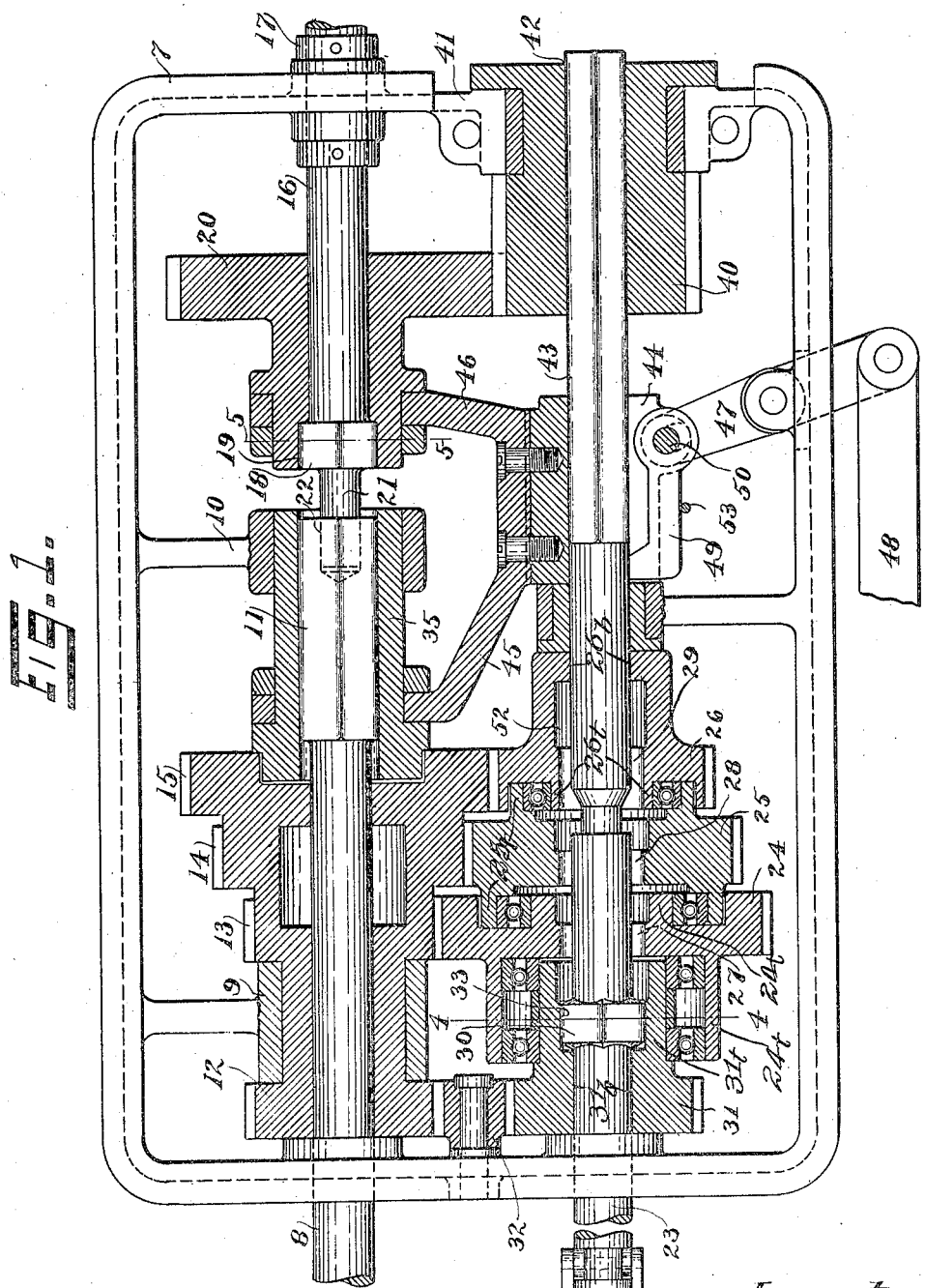

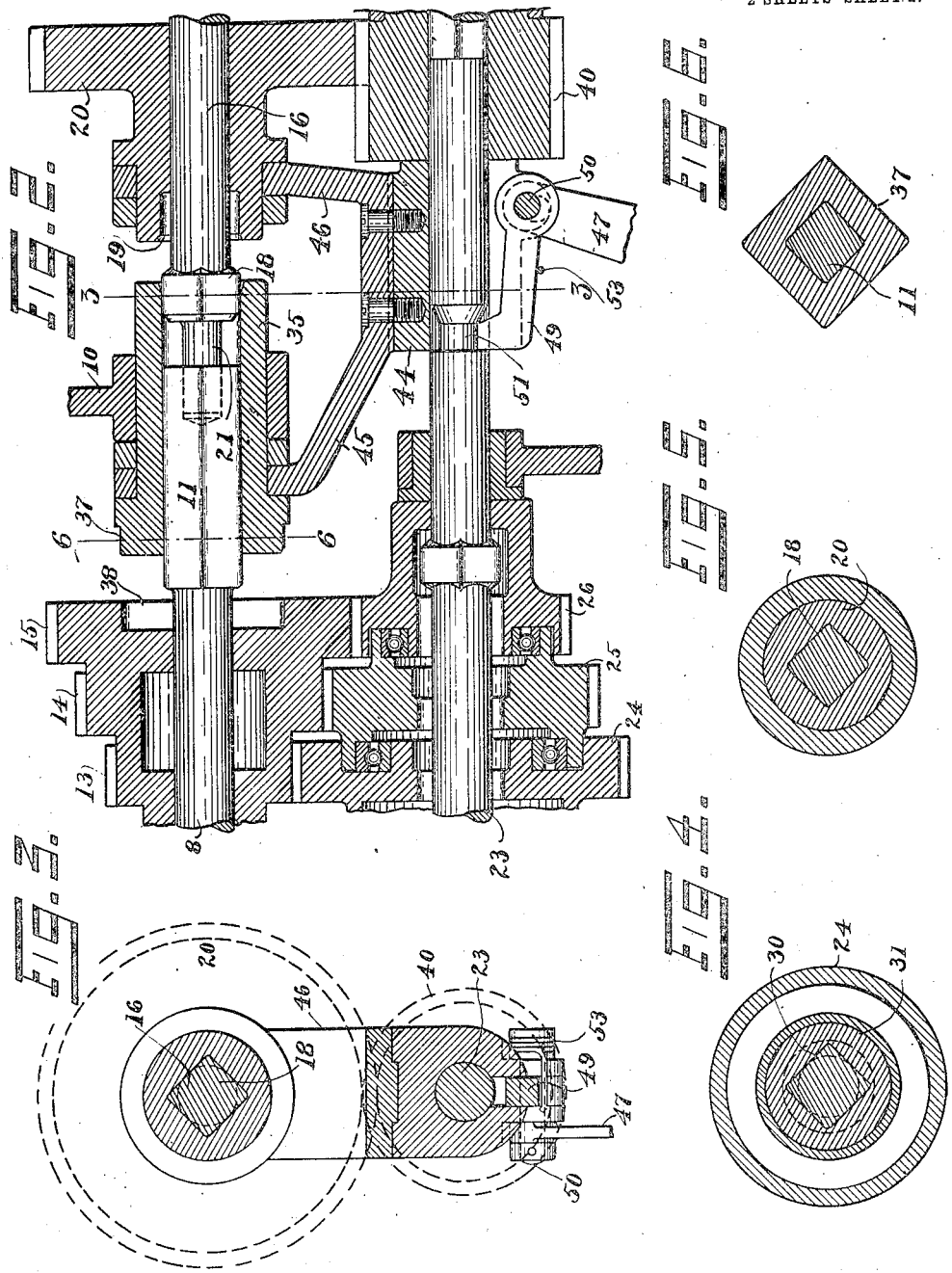

CHARLES J. PAULSON, OF NEW YORK, N. Y., ASSIGNOR TO ALBERT J. NOTHACKER, OF NEW YORK, N. Y.

TRANSMISSION MECHANISM.

1,104,444.

Specification of Letters Patent. Patented July 21, 1914.

Application filed November 25, 1912. Serial No. 733,243.

*To all whom it may concern:*

Be it known that I, CHARLES J. PAULSON, a subject of the King of Sweden, residing in New York city, borough of Brooklyn, county and State of New York, have invented certain new and useful Improvements in Transmission Mechanism, of which the following is a specification.

This invention has for its object to provide an improved arrangement of gear transmission, in which the driven shaft can be connected with the driving shaft to drive at several forward speeds, or directly connected, or connected for reverse; and which construction permits the direct shifting from any one of the lower speeds, or from the reverse, to the high speed direct connection.

In the accompanying drawings, showing one embodiment of my invention, Figure 1 is a vertical section. Fig. 2 is a similar view with certain parts omitted, with the parts shifted to different positions. Fig. 3 is a section on the line 3—3 of Fig. 2. Fig. 4 is a section on the line 4—4 of Fig. 1. Fig. 5 is a section on the line 5—5 of Fig. 1. And Fig. 6 is a section on the line 6—6 of Fig. 2.

A casing 7 is shown. A driving shaft 8 is mounted to rotate in suitable bearings, as 9 and 10 in the casing, which shaft has an end engaging portion 11 formed with flat sides, preferably square as indicated in Fig. 6. On this shaft 8 are loosely mounted a primary reversing gear 12 and also three primary gears, 13, 14 and 15, of graduated sizes, secured together, fast to the gear 12, being shown as four integral gears loose on the shaft 8.

In alinement with the shaft 8 is a driven shaft 16 rotatable in a suitable bearing, as 17. This driven shaft has a squared or polygonal engaging portion 18 like that of the driving shaft 8 arranged to fit in a similar shaped enlargement or socket 19 in the bore of a gear member 20, the latter being loose to rotate on the shaft, as indicated in Fig. 2, but connected with the shaft by this squared portion 18 when the gear is shifted to the position indicated in Fig. 2, by means hereinafter set forth. The shaft 16 has an extension 21 projecting into a cylindrical bore 22 in the extension 11 of the main shaft 8, that serves to guide and steady the driven shaft 16.

A third or counter shaft 23 is mounted to rotate in suitable bearings in the casing, parallel with the said two shafts.

I provide clutching means for simultaneously engaging the driving shaft 8 with its primary gear 12—15 and disengaging the driven shaft 16 from its final gear 20, or for engaging the latter two while disengaging the former two; said clutching means comprising the polygonal end sections 11 and 18 of said shafts; a corresponding female engagement formed in a sleeve 35 slidable on said members and in a bearing 10 formed on the frame 7, and a polygonal (square) head 37 on the sleeve 35 and a corresponding socket, 38, in the primary gear 12—15.

The sleeve 35 and final gear 20 are distanced and made simultaneously movable by attachment, respectively, to arms 45 and 46 extending from a movable carriage 44 enveloping the countershaft 23 and adapted to be engaged and moved thereby during part of its anterior movement by means of a pawl 49 pivoted on the carriage 44 by a pin 50 and upheld by an engaging spring 53, so that its head may, at proper times, engage a shoulder, 51, formed in the countershaft by grooving it, the opposite side of the groove being beveled, as illustrated, so that a posterior movement of said shaft will lift and disengage the pawl.

To move the carriage 45 and simultaneously engage or disengage the driving shaft 8 with or from its primary gear and the driven shaft with or from its final gear, I provide a lever 47 fulcrumed on the casing 7, connected with the carriage 44 by a slot enveloping the pin 50 and having an exterior operating link 48.

My intermediate gear comprises a reversing pinion 32 revolubly mounted on the case 7 and in mesh with the primary reversing gear 12; and, enveloping the countershaft 23, a reversing gear 31 in mesh with the reversing pinion, and a graduated series of speed reducing gears 24, 25 and 26 in mesh with the corresponding primary gears 13, 14 and 15; all the above gears being loosely mounted on the countershaft, and, revoluble with it, a transmission gear 40, in mesh with the final gear 20 and illustrated as revolubly mounted in a bearing 41 in the case 7, and engaged with the countershaft 23 by male and female engaging members respectively, 42 and 43, the former a polygonal socket in the gear and the latter a corresponding prismatic section of the shaft.

I provide means to engage and disengage the countershaft 23 with and from the reversing and reduction gears 31, 24, 25 and 26, independently and successively by a continuous (or interrupted) reciprocation of said shaft, said means comprising a polygonal engaging hub 30 on the shaft and corresponding sockets 33, 27, 28 and 29 in the several gears 31, 24, 25, 26, and chambers 52 between adjacent sockets and anterior to the socket 29 in the gear 26; said chambers 52 being larger than the hub 30 so that it can turn freely in them and illustrated as enlargements of the bores in said gears.

In order to produce a more compact mechanism and also to avoid a multiplicity of fixed bearings for the intermediate gear train and the inevitable binding thereby occasioned, I provide bearings $31^b$, $26^b$ in the gears 31 and 26, respectively, by which they are mounted on the countershaft and on said gears I float the interior gears 24 and 25 by means of float bearings formed between overlapping bearing-tubes $31^t$, $24^t$, $25^t$ and $26^t$, formed on the respective wheels 31, 24, 25 and 26.

Fig. 2 shows my direct drive; the carriage 44, sleeve 35 and final gear 20 in anterior position; the latter disengaged from the driven shaft 16 and the primary gear 12—15 from the sleeve; which permanently engages the driving shaft 8 by means of its polygonal section 11, and when in this position also engages the like section 18 of the driven shaft 16, thus directly coupling the said shafts. During direct drive the transmission gear 40 is revolved because in permanent mesh with the final gear 20 and revolves the countershaft 23, the engaging hub 30 of which is located in one or other of the chambers 52 (here illustrated as in the anterior one) and disengaged from the intermediate gears, which rest, as also do the primary gear because disengaged from the driving shaft.

Fig. 1 shows my reverse drive; the carriage 44, sleeve 35, and final gear 20 in anterior position; the sleeve 35 (which permanently engages the polygonal section of the driving shaft 8), by its head 37 engaged with the socket 38 in the primary gear 12—15 and engaging the latter with the driving shaft; the final gear 20, by means of its socket 19 and the head 18 of the driven shaft 16 engaging the latter and directly coupling the driving and driven shafts; the countershaft 23 in posterior position, engaged with its reversing gear 31 because the hub 30 of said shaft is in the socket 33 of said gear (and by the reversing pinion 32 in train with the primary reversing gear 12), and permanently engaged with the transmission gear 40 by means of their respective polygonal end 43 and socket 42.

When my gears are so connected, the speed-reducing series 13—15 and 24—26 revolve idly and power is transmitted from the driving shaft 8 through its reversing gear 12, the intermediate reversing pinion 32 and reversing gear 31, the countershaft 23, transmission gear 40 and final gear 20 to and revolves the driven shaft 16.

Change from the reverse to the forward drive at any intermediate speed is accomplished by anterior movement of the countershaft 23, shifting its hub 30 from the reversing gear socket 33 into the socket 27, 28 or 29 of one of the speed reduction series 24, 25 or 26. Change from reverse to direct drive can be accomplished by manual anterior shift of the countershaft without manual manipulation of the lever 47 and sleeve 35, and in either of three ways by manipulation of the counter shaft and subsequent manipulation of the lever and sleeve. By the first method, the full anterior traverse of the countershaft shifts its hub 30 from engagement with the reversing gear socket 33 (Fig. 1) through those of the speed reducing series and into the anterior chamber 52 (Fig. 2), and while it is passing through the socket 29 in the anterior reducing gear 26, the shoulder 51 of the countershaft engages the pawl 49 of the carriage 44, so that the completion of the anterior shift of the countershaft also shifts the sleeve 35, uncouples it and the driving shaft from the primary gear and the driven shaft from the final gear and couples the driving and driven shafts direct. Practical experience has demonstrated that this shift can be accomplished surely and easily. By one of the other methods, the countershaft is first manipulated to shift its hub 30 from engagement with the reversing gear 31 into, say, the adjacent chamber 52 and the lever 47 is thereupon manipulated to shift the sleeve 35 and uncouple the driving and driven shafts from their respective gears and couple them direct. By other methods the shift of the countershaft hub 30 may locate it in a chamber 52 between the gears 24 and 25, or between the gears 25 and 26. These various possible locations of the countershaft hub 30 enables a chauffeur to anticipate the exigencies of travel and, either when driving direct or when changing speed, to locate said hub adjacent to that gear, or between those two gears, one of which, he believes he will next change to, and thus prepare to make an anticipated change in the speed or direction of drive in the least possible time and with the greatest safety. Such shifts can be made without difficulty during direct drive because then the primary and final gears are uncoupled from the driving and driven shafts and all the gears are at rest.

When the countershaft hub 30 is in the anterior chamber 52 (Fig. 2) change from direct to reduced high-speed drive may be made by manipulating the lever 47 only because the pawl 49 will then be in engagement with the shoulder 51 of the countershaft and will move it so as to locate its hub 30 in the socket 29 of the high speed gear 26 and couple said gear to the countershaft by the same motion of the lever 47 which causes the sleeve 35 to uncouple the driving and driven shafts from one another and engage them respectively with the primary and final gears. Shifts from direct to mean or low speed or to reverse may be made by first shifting, as just described, to reduced high speed and subsequently manipulating the countershaft, but are most quickly made by first manipulating said shaft to bring its hub 30 into engagement with the proper gear and subsequently manipulating the lever 47. Shifts from one to another intermediate speed are made by properly manipulating the countershaft solely.

It will be further observed that all of the engaging gear members are constantly in engagement and hence obviate the great disadvantage of throwing gear members into and out of mesh, while at high speed none of the gears rotate. The connection is effected through the squared hub portions and not through the engagement and disengagement of any pair of gears.

It is obvious that other geometrically arranged or shaped holes in the gears and lugs on the shafts, may be used; all of which may be of polygonal form and still be within the scope of my invention. While throughout the drawings I have shown square bores and square connectors, I do not desire to be limited to such forms.

Having thus described my invention, I claim:—

1. A driving shaft, a driven shaft co-axial therewith, an axially movable countershaft, a gearing comprising primary members on the driving shaft, final members on the driven shaft and intermediate members enveloping the countershaft, clutching means operable by the reciprocation of the counter shaft adapted to connect it with one or another intermediate gear, clutching means adapted, at one time, to engage the driving and driven shafts and disengage them from the gear train, and at another time to disengage said shafts and engage the driving shaft with the primary gear and the driven shaft with the final gear, and engaging means adapted to engage and disengage the two clutching means with and from one another.

2. A driving shaft, a driven shaft co-axial therewith, an axially movable countershaft, a gearing comprising primary members on the driven shaft, final members on the driven shaft and intermediate members enveloping the counter shaft, clutching means operable by the reciprocation of the countershaft adapted to connect it with one or another intermediate gear, a carriage adjacent to the countershaft, means to operate said carriage, a pawl adapted to engage and disengage said carriage and shaft, and clutch means connected with said carriage and adapted, at one time, to engage the driving and driven shafts and disengage them from the gear train, and at another time to disengage said shafts and engage the driving shaft with the primary gear and the driven shaft with the final gear, clutching means operable by movement of the countershaft, adapted to engage said shaft with and disengage it from an intermediate gear of said train, and means to move said countershaft.

3. A gear case, a driving shaft, a driven shaft co-axial therewith, an axially movable countershaft, a gearing comprising a primary member loose on the driving shaft provided with a reversing gear and a graduated series of gears, a final gear loose on the driven shaft and intermediate gears comprising a reversing pinion revolubly mounted on the case, a gear mounted in the case revoluble with the countershaft and engaging the final gear, and enveloping said shaft, a reversing gear and a graduated series of gears severally engaging the corresponding primary gears, each of said intermediate reversing and reducing gears having a countershaft-engaging socket, an engaging member on the countershaft adapted to engage the aforesaid sockets severally, a carriage enveloping the countershaft, means to reciprocate said carriage, a pawl on said carriage adapted to engage it and disengage it from the countershaft, clutching means connected with said carriage and adapted, at one time, to engage the driving and driven shafts and disengage them from the gear train, and at another time to disengage said shafts and engage the driving shaft with the primary gear and the driven shaft with the final gear, and means to reciprocate said countershaft.

4. A gear case, a driving shaft, a driven shaft co-axial therewith, an axially movable countershaft, a gearing comprising a primary member loose on the driving shaft and provided with a reversing gear and a graduated series of reducing gears, a final gear loose on the driven shaft and intermediate gears comprising a reversing pinion revolubly mounted on the case, a gear mounted in the case revoluble with the countershaft and engaging the final gear, and, enveloping said shaft, a reversing gear and a graduated series of reducing gears severally engaging the corresponding primary gears, each of said intermediate reversing and reducing gears having a countershaft-engaging socket, an engaging member on the countershaft adapted to engage the aforesaid sockets severally, the sockets aforesaid, in adjacent intermediate gears, being separated by distances exceeding the axial dimension of said engaging member on the countershaft, a carriage enveloping the countershaft, means to reciprocate said carriage, a pawl on said carriage adapted to engage it and disengage it from the countershaft, clutching means connected with said carriage and adapted, at one time, to engage the driving and driven shafts and disengage them from the gear train, and at another time to disengage said shafts and engage the driving shaft with the primary gear and the driven shaft with the final gear, and means to reciprocate said countershaft.

5. A driving shaft, a driven shaft co-axial therewith, an axial movable countershaft, a gearing comprising primary gears loose on the driving shaft, a final gear loose on the driven shaft, a reversing pinion elsewhere mounted and intermediate gears enveloping the countershaft, clutching means adapted, at one time, to engage the driving and driven shafts and disengage them from the gear train, and at another time to disengage said shafts and engage the driving shaft with the primary gears and the driven shaft with the final gear, clutching means, operable independently of the first named clutching means, adapted to engage the countershaft with one intermediate gear and to release said gear without engaging another gear, and automatically engaging means adapted to automatically connect the two clutching means when the first named clutching means is operated to disconnect the driving and driven shafts.

6. A driving shaft, a driven shaft co-axial therewith, an axially movable countershaft, a gearing comprising a primary member loose on the driving shaft and provided with a reversing gear and a graduated series of change gears, a final gear loose on the driven shaft and intermediate gears comprising a reversing pinion, a gear engaging the final gear and revoluble with the countershaft and, enveloping said shaft, a reversing gear and a graduated series of change gears severally engaging the corresponding primary gears, clutching means adapted, at one time, to engage the driving and driven shafts and disengage them from the gear train, and at another time to disengage said shafts and engage the driving shaft and the primary gear and the driven shaft with the final gear, clutching means operable by a movement of the countershaft and independently of the first named clutching means and adapted to engage and pass out of engagement, independently and successively, with the reversing gear and the gears of the graduated speed series, and means to reciprocate the countershaft.

7. A driving shaft, a driven shaft co-axial therewith, an axially movable countershaft, a gearing comprising a primary member loose on the driving shaft and provided with a reversing gear and a graduated series of change gears, a final gear loose on the driven shaft and intermediate gears comprising a reversing pinion, a gear engaging the final gear and revoluble with the countershaft and, enveloping said shaft, a reversing gear and a graduated series of change gears severally engaging the corresponding primary gears, clutching means adapted, at one time, to engage the driving and driven shafts and disengage them from the gear train, and at another time to disengage said shafts and engage the driving shaft and the primary gear and the driven shaft with the final gear, clutching means operable by a movement of the countershaft and independently of the first named clutching means and adapted to engage and pass out of engagement, independently and successively, with the reversing gear and the gears of the graduated speed series, means to reciprocate the countershaft, and automatic connecting means adapted, when the first-named clutching means is operated to disconnect the driving and driven shafts, to connect said clutching means with the countershaft and shift it out of engagement with an intermediate gear.

8. A driving shaft, a driven shaft co-axial therewith, primary gears comprising a reversing gear and a graduated series of change speed gears, a final gear on the driven shaft, a reversing pinion elsewhere mounted, a countershaft, a transmission gear revoluble therewith, and, enveloping said countershaft, a series of change speed gears comprising a reversing gear and graduated speed gears, the outer gears of said series being provided with bearings whereby they are mounted on the countershaft, and floating means adapted to float the inner on the outer gears of said series.

9. A driving shaft, a driven shaft co-axial therewith, primary gears comprising a reversing gear and a graduated series of change speed gears, a final gear on the driven shaft, a reversing pinion elsewhere mounted, a countershaft, a transmission gear revoluble therewith, and, enveloping said countershaft, a series of change speed gears comprising a reversing gear and graduated speed gears, the outer gears of said series being provided with bearings whereby they are mounted on the countershaft, and also with bearing tubes adapted to float the inner on the outer gears of said series.

10. A driving shaft, a driven shaft co-axial therewith, a movable countershaft, a gear train comprising primary gears loose on the driving shaft, a final gear loose on the driven shaft, a reversing pinion elsewhere mounted and a series of change speed gears comprising a reversing gear and graduated speed gears enveloping the countershaft, clutching means adapted, at one time, to engage the driving and driven shafts direct and disengage them from the gear train, and at another time to disengage said shafts and engage the driving shaft with the primary and the driven shaft with the final gear, and clutching means operable independently of the first named clutching means and adapted to engage said countershaft with and disengage it from any gear of said change-speed series and to be moved to the position antecedent to engagement with any gear of said change speed series.

CHARLES J. PAULSON.

Witnesses:
  JOHN MORRIS,
  H. D. PENNEY.

Copies of this patent may be obtained for five cents each, by addressing the "Commissioner of Patents, Washington, D. C."